United States Patent [19]

Steinkämper et al.

[11] Patent Number: 4,678,361
[45] Date of Patent: Jul. 7, 1987

[54] SHAFT CONNECTION ARRANGEMENT

[75] Inventors: Reinhard Steinkämper, Stuttgart; Wolf Boll, Weinstadt; Karl Peitsmeier, Neuhausen, all of Fed. Rep. of Germany

[73] Assignee: Daimler-Benz Aktiengesellschaft, Fed. Rep. of Germany

[21] Appl. No.: 790,516

[22] Filed: Oct. 23, 1985

[30] Foreign Application Priority Data

Oct. 24, 1984 [DE] Fed. Rep. of Germany ....... 3438918

[51] Int. Cl.$^4$ .......................... B25G 3/28; F16B 3/00
[52] U.S. Cl. ........................................ 403/359; 74/409
[58] Field of Search ........................... 403/359; 74/409

[56] References Cited

U.S. PATENT DOCUMENTS

| 3,318,170 | 5/1967 | Runkle | 403/52 X |
| 3,399,549 | 9/1968 | Nagele | 403/359 X |
| 4,036,075 | 7/1977 | Lassanske | 74/409 |

FOREIGN PATENT DOCUMENTS 1814609 7/1969 Fed. Rep. of Germany .

Primary Examiner—Andrew V. Kundrat
Attorney, Agent, or Firm—Barnes & Thornburg

[57] ABSTRACT

A driving connection between spline shafts and spline bore hubs of safety steering columns, where the shaft and the hub, because of prestressing torque existing between the two, can be shifted with respect to one another axially but are free from torsional play. The prestressing torque is generated by a torsion spring element supported between the shaft and the hub. The required freedom from torsional play is achieved by arranging a main hub and an additional hub on the shaft with the torsion spring element connecting the main hub with the additional hub so that the main hub and the additional hub are spring loaded in opposite rotational directions.

7 Claims, 12 Drawing Figures

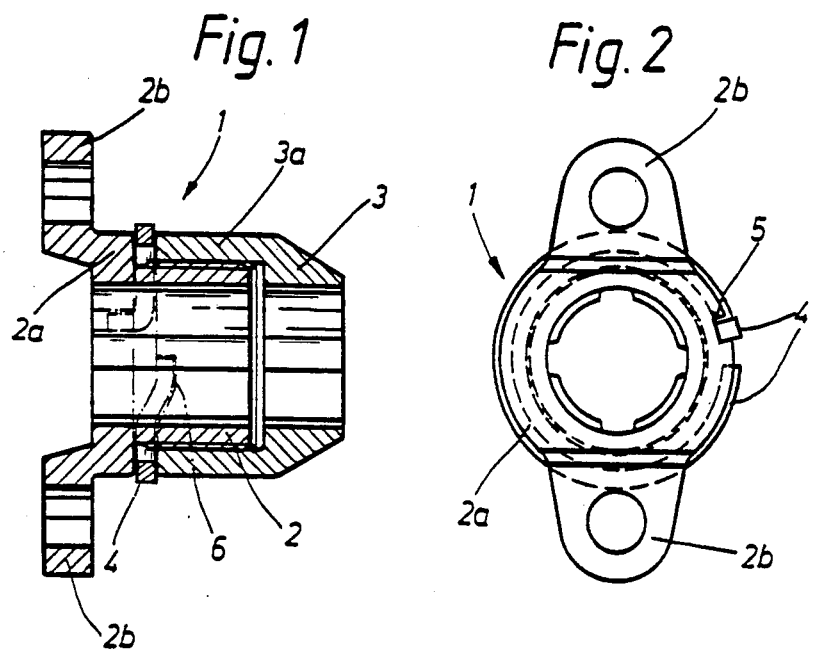
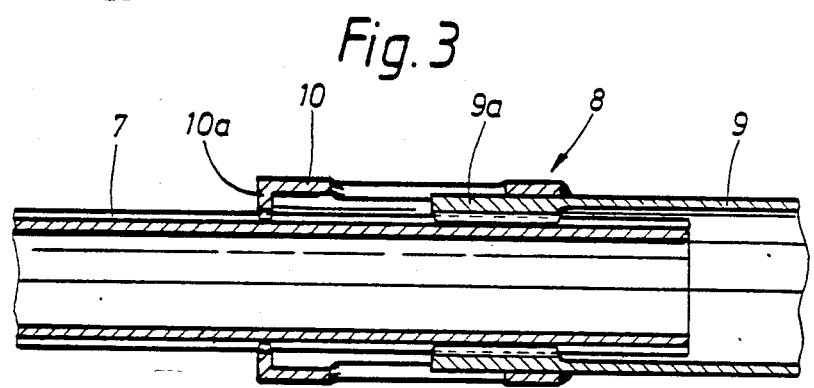
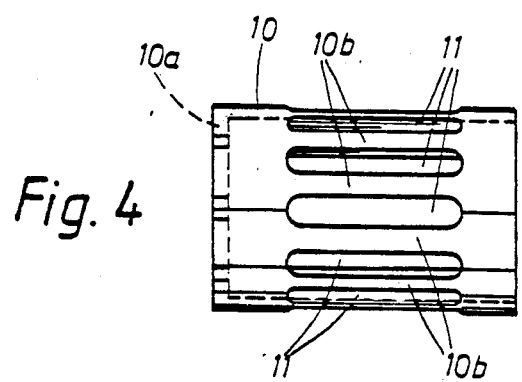

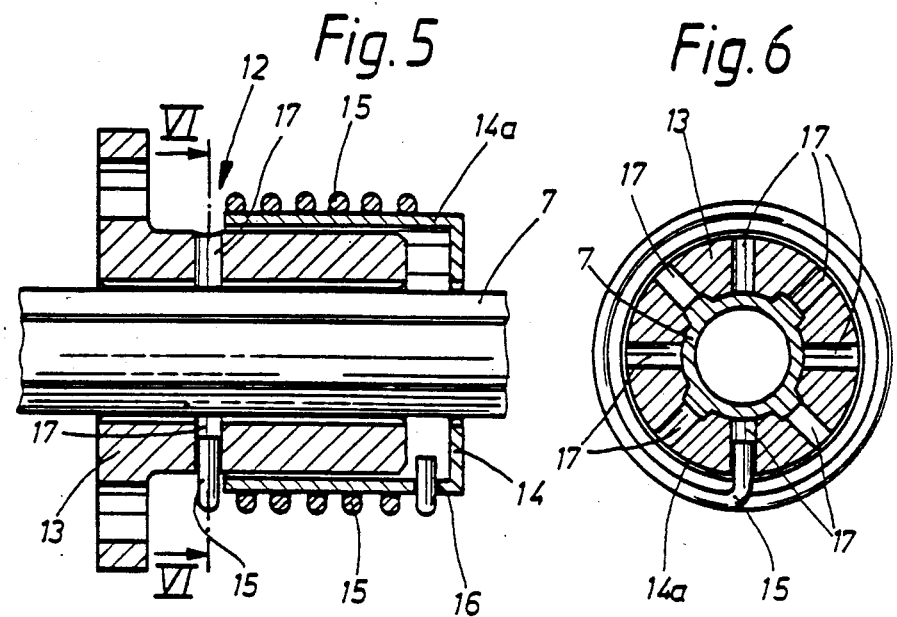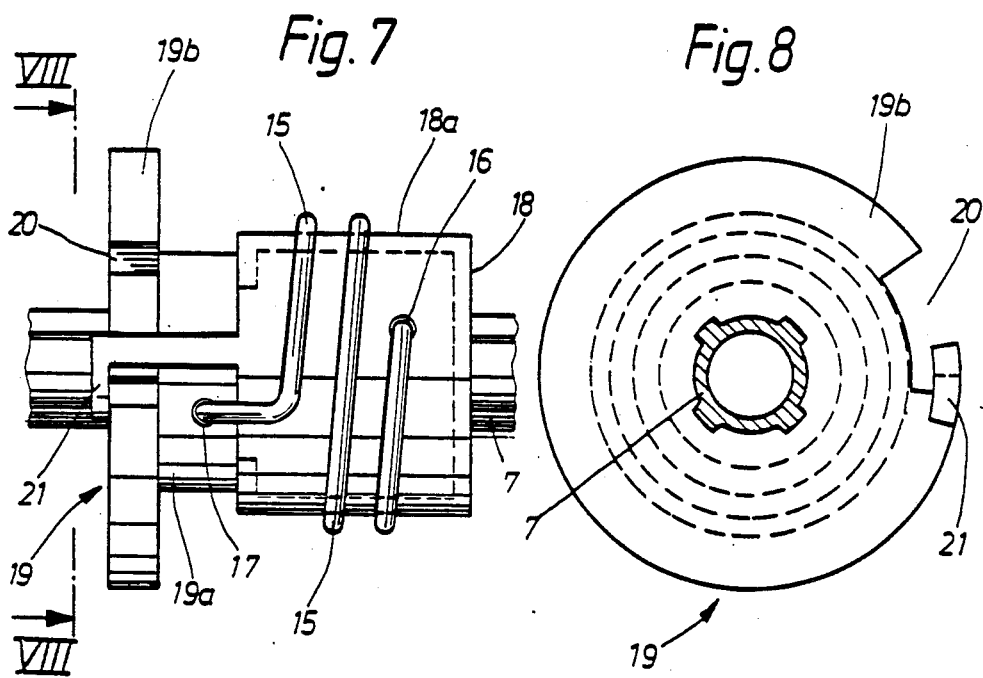

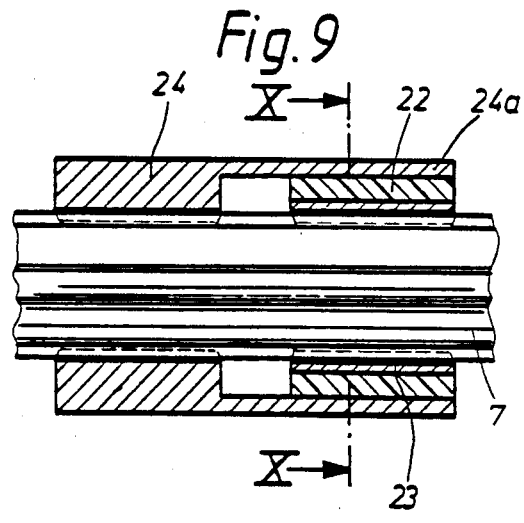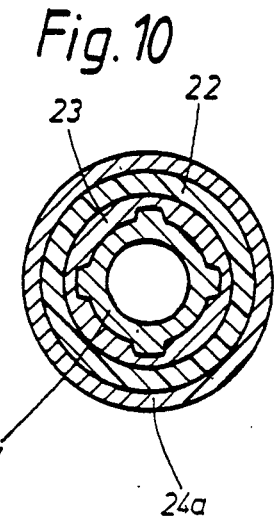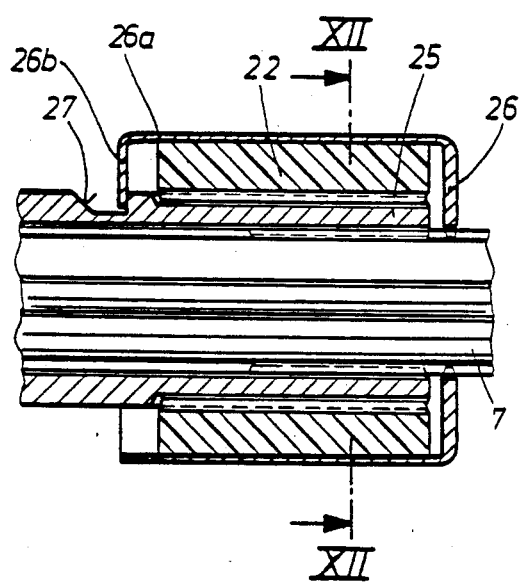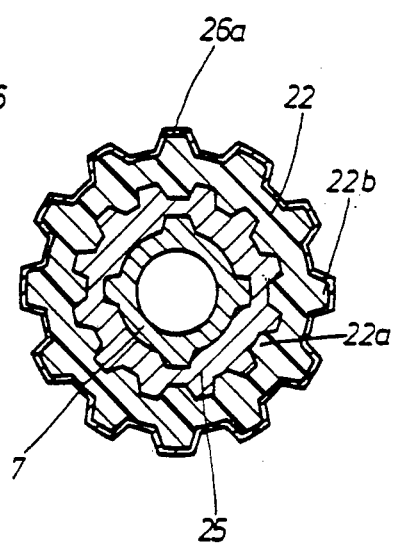

SHAFT CONNECTION ARRANGEMENT

BACKGROUND AND SUMMARY

This invention relates to a driving connection between a shaft and a hub, in particular, a driving connection between spline shafts and spline bore hubs of safety steering columns.

A driving connection of this general type is shown in U.S. Pat. No. 3,318,170 to Runkle. In the arrangement of this patent, freedom from play is achieved by the radial tilting of a hexagonal shaft in the hub that forms the counterpart. The required torque can be introduced into the hexagonal shaft by diametrically arranged cylindrical rollers which support themselves in the edge area of two opposite lateral surfaces and which are braced with respect to the hub by means of a ring sleeve that is loaded by a spring. However, this arrangement can be used only when a polygonal profile having sufficiently wide lateral surfaces is used as the shaft. It cannot be used for spline shaft and spline bore hub or serrated driving connections. In addition, this driving connection having freedom from play is extremely costly to produce in series production quantities.

An objective of the present invention is to provide a safety steering column driving connection free from torsional play that can be used between the shaft and the hub for different types of guide profiling, while also minimizing the production and assembly costs.

This objective of the present invention is achieved by providing a coupling comprised of two coupling parts, drivingly connected to the shaft, with these parts resiliently biased in opposite rotational directions with respect to one another. In especially preferred embodiments of the invention a torsion spring element serves to bias the two coupling parts in opposite rotational directions.

In a preferred embodiment of the invention, the coupling parts are constructed as a spline bore hub comprised of a main hub part and an additional hub part, which are mountable on the steering shaft. The hub parts are connected to each other by a torsion spring element.

Further objects, features, and advantages of the present invention will become more apparent from the following description when taken with the accompanying drawings, which show for purposes of illustration only, embodiments constructed in accordance with the present invention.

BRIEF DESCRIPTION OF THE DRAWINGS

FIG. 1 is a longitudinal sectional view through a coupling arrangement constructed in accordance with a preferred embodiment of the present invention;

FIG. 2 is an end view of the arrangement of FIG. 1;

FIG. 3 is a longitudinal sectional view through a steering shaft and coupling arrangement constructed in accordance with another preferred embodiment of the present invention;

FIG. 4 is a lateral perspective view of the hub part of the of the embodiment shown in FIG. 3;

FIG. 5 is a longitudinal sectional view through a steering shaft and coupling arrangement constructed in accordance with another preferred embodiment of the present invention;

FIG. 6 is a cross-sectional view taken along line VI—VI of the embodiment of the invention as shown in FIG. 5;

FIG. 7 is a longitudinal view of a modified embodiment of the connection area of FIG. 5;

FIG. 8 is a sectional view taken along line VIII—VIII of the embodiment shown in FIG. 7;

FIG. 9 is a longitudinal sectional view through a steering shaft and coupling arrangement constructed in accordance with another preferred embodiment of the present invention;

FIG. 10 is a cross-sectional view taken along line X—X of the embodiment shown in FIG. 9;

FIG. 11 is a longitudinal sectional view similar to FIG. 9, showing a yet further preferred embodiment of the invention; and FIG. 12 is a cross-sectional view taken along line XII—XII of the embodiment shown in FIG. 11.

DETAILED DESCRIPTION OF THE DRAWINGS

FIGS. 1 and 2 show a coupling arrangement in the form of a spline bore hub 1 which is assembled from several parts. Hub 1 is comprised of a main hub 2 on which a collar 2a and a flange 2b are formed, an additional hub 3 and a leg spring 4. The stepped section of the main hub 2 is equipped with an external thread onto which a tension nut 3a that is part of the additional hub 3 is screwed in the manner of a spigot nut. The leg spring 4, which in this embodiment has a rectangular cross-section, is axially positioned between the tension nut 3a and the collar 2a. Instead of the leg spring 4 described above, embodiments of the present invention which use a round-wire spring having one or several coils have also been contemplated. However, in these embodiments, the round-wire spring between the collar 2a and the tension nut 3a should still be sufficiently guided in the unstressed condition. One end of the leg spring 4 is bent approximately 90 degrees and engages in a recess 5 of the collar 2a so as to act as a rotation securing means. The second free end of the leg spring 4 is crossed in the direction of the tension nut 3a and rests in an at least partially wedge-shaped recess 6 of the tension nut 3a. Thus, the tension nut 3a can be turned in releasing direction relative to the main hub 2 only against the radial spring tension of the leg spring 4.

The spline bore hub 1 is preassembled by fitting the leg spring 4 onto the main hub 2 and screwing on the tension nut 3a until the crossed end of the leg spring 4 engages in the recess 6. For the detachment of the spline bore hub 1, the crossed end of the leg spring 4, by means of a screwdriver or similar device, is deflected in the direction of the collar 2a so that the tension nut 3a can be unscrewed and the leg spring removed.

The preassembled spline bore hub 1 is mounted on an assigned spline shaft by pushing the additional hub 3 of the spline bore hub 1, up to the transition of the spline bore hub profile from the main hub 2 to the additional hub 3, onto the spline shaft. The main hub 2 is then twisted relative to the additional hub 3 while the leg spring 4 is expanded until the desired prestressing of the spring is achieved. The main hub 2, when the leg spring 4 is prestressed, is also pushed onto the spline shaft. When the spline bore hub 1 is located on the spline shaft, a torque balance occurs between the main hub 2 and the additional hub 3 because the main hub 2 and the additional hub 3 are spring loaded in opposite rotating directions.

Since the spline bore hub profiles of the main hub 2 and the additional hub 3 rest on the profile flanks of the spline shaft, there is freedom from play for the axial shifting between the spline shaft and the spline bore hub 1.

In addition, the driving connection is also free from play radially until the torque is reached that is created by the leg spring 4. When a torque is introduced into the driving connection that is larger than the prestressing torque, the driving connection is completely free from play in one rotating direction, but has some play in the other rotating direction against the prestressing torque. In the latter case, the existing play is not noticed subjectively because the prestressing torque of the leg spring 4 must be overcome via the angle of rotation of the play.

FIGS. 3 and 4 show another embodiment of the invention of a driving connection between a spline shaft 7 and a spline bore hub 8 where the spline bore hub 8 is rigidly connected with a tube body 9 which slidably interacts with the spline shaft 7 telescopically.

The spline bore hub 8 comprises a main hub 9a on tube body 9 and a spring pin sleeve 10 and an additional hub 10a which are of unitary construction. In a preferred embodiment, the spring pin sleeve 10 is comprised of a sleeve body made of a rubber-elastic material with several longitudinal slots 11 distributed circumferentially such that individual leaf spring elements 10b remain between the longitudinal slots 11. By this measure, the spring pin sleeve 10 is changed into a torsion spring element. For the torque support between the main hub 9a and the additional hub 10a, the end of the spring pin sleeve 10 that is opposite the additional hub 10a must be fastened on the main hub 9a so that it is secure with respect to rotation. The fastening may take place by known releasable or non-releasable connecting techniques.

The mounting of the spline bore hub 8 on the spline shaft 7, as well as for the other described embodiments which follow, takes place analogously to the mounting of the spline bore hub 1. This also applies to the effects of the prestressing torque in providing the freedom from play in the driving connections for the various embodiments described.

In the embodiment of the present invention shown in FIG. 5 and FIG. 6, a spline bore hub 12 is located on the spline shaft 7. The spline bore hub 12 is formed by a main hub 13, an additional hub 14 onto which a sleeve body 14a is shaped, and a leg spring 15. The sleeve body 14a is pushed onto the main hub 13 and the leg spring 15 is wound around its outer circumference. One of the free ends of the leg spring 15 is bent and engages into a circumferential radially extending bore 16 of the sleeve body 14a, while the second free end of the leg spring 15 engages into one of several circumferential spaced radial bores 17 located on the circumference plane of the main hub 13. The leg spring 15, in this embodiment, also prevents axial shifting of the additional hub 14 with respect to the main hub 13.

In the modified embodiment of the present invention shown in FIG. 7 and FIG. 8, the securing against axial shift between an additional hub 18 and a main hub 19 takes place by an additional bayonet catch. For this purpose, a collar 19a is provided at the main hub 19 against which one front side of a sleeve body 18a rests that is connected in one piece with the additional hub 18. A bayonet recess 20 is taken out of a ring flange 19b on the side of the main hub, with a bayonet hook 21 which projects from the sleeve body 18a engaging into said bayonet recess 20, and which reaches behind the ring flange 19b.

FIGS. 9 and 10 show another embodiment of a driving connection where the torsion spring element is formed by a rubber-elastic bush 22. The rubber-elastic bush 22 which may, in a preferred embodiment, consist of an elastomer plastic material, is fastened between the outer circumference of a socket end 24a projecting from a main hub 24. Known gluing and vulcanizing processes are suitable as connecting processes. By means of such connecting techniques, the bush 22 can take over not only the function of the torsion spring element but also that of the axial support of the additional hub 23 with respect to the main hub 24.

This is not the case in the embodiment of the present invention as shown in FIGS. 11 and 12. In this embodiment, the bush 22 has an internal toothing 22a and an external toothing 22b and is held in a form-fitting manner between an external profile of a main hub 25 and an internal profile of a connection piece 26a projecting from an additional hub 26. The additional hub 26 is secured against axial shifting with respect to the main hub 25 by a lug 26b on the connection piece, said lug 26b engaging in a ring groove 27 of the main hub 25. Before the mounting of the additional hub 26, the lug 26b is in alignment with the connection piece 26a and, after the bush 22 and the connection piece 26a are pushed on, is bent in the manner of a locking plate.

Although the present invention has been described and illustrated in detail, it is to be clearly understood that the same is by way of illustration and example only, and is not to be taken by way of limitation. The spirit and scope of the present invention are to be limited only by the terms of the appended claims.

What is claimed is:

1. A driving connection for a safety steering column for a vehicle, comprising:
   first coupling part means having axial guide means for guiding axial movement of said first coupling part means on a steering shaft means;
   second coupling part means having axial guide means for guiding axial movement of said second coupling part means on said steering shaft means;
   resilient means interposed between said first and second coupling part means for biasing said first coupling part means and said second coupling part means in opposite rotational direction with respect to one another;
   wherein said couling means is a two part bore hub comprisied of a main hub part and additional hub part mounted around said shaft, wherein said shaft and said two part bore hub are splined; wherein said resilient means is a leg spring; and
   wherein said additional hub part includes a tension nut, and said main hub includes an externally threaded end section for threadably engaging said additional hub part, and wherein said leg spring biases said tension nut in the screwing direction.

2. The driving connection of claim 1, wherein said main hub part includes a collar with a recess for securing one leg of said leg spring, said tension nut including an at least partially wedge-shaped recess for securing a second leg of said leg spring, and wherein said recesses axially position said leg spring.

3. A driving connection for a safety steering column for a vehicle, comprising:

first coupling part means having axial guide means for guiding axial movement of said first coupling part means on a steering shaft means;

second coupling part means having axial guide means for guiding axial movement of said second coupling part means on said steering shaft means;

resilient means interposed between said first and second coupling part means for biasing said first coupling part means and said second coupling part means in opposite rotational direction with respect to one another;

wherein said coupling means is a two part bore hub comprised of a main hub part and additional hub part mounted around said shaft, wherein said shaft and said two part bore hub are splined; wherein said resilient means is a leg spring; and wherein said additonal hub part includes a sleeve body pushed over one end of said main hub part, and further including a circumferential bore for engaging one end of said leg spring, and wherein said main hub part includes a circumferential bore for engaging a second leg of said leg spring, and wherein said leg spring is coiled around said additional hub part.

4. A driving connection for a safety steering column for a vehicle, comprising:

first coupling part means having axial guide means for guiding axial movement of said first coupling part means on a steering shaft means;

second coupling part means having axial guide means for guiding axial movement of said second coupling part means on said steering shaft means;

resilient means interposed between said first and second coupling part means for biasing said first coupling part means and said second coupling part means in opposite rotational direction with respect to one another;

wherein said coupling means is a two part bore hub comprised of a main hub part and additional hub part mounted around said shaft, wherein said shaft and said two part bore hub are splined; wherein said resilient means is a leg spring; and wherein one of said hub parts is provided with a bayonet catch to prevent axial shifting of said additional hub part with respect to said main hub part.

5. The driving connection of claim 4, wherein a ring flange is fastened at the main hub, said ring flange having at least one bayonet recess, and wherein a bayonet hook is attached to said additional hub, for engaging said bayonet recess, and which reaches behind said ring flange while said leg spring is prestressed.

6. A driving connection for a safety steering column for a vehicle, comprising:

first coupling part means having axial guide means for guiding axial movement of said first coupling part means on a steering shaft means;

second coupling part means having axial guide means for guiding axial movement of said second coupling part means on said steering shaft means, resilient means interposed between said first and second coupling part means for biasing and said first coupling part means and said second coupling part means in opposite. rotational directions with respect to one another;

wherein said coupling means is a two part bore hub comprised of a main hub part and additional hub part mounted around said shaft, wherein said shaft and said two part bore hub are splined; and wherein the resilient means is a spring pin sleeve, with leaf spring elements formed as part of said sleeve connecting said main hub part and said additional hub part, and arranged concentrically with respect to said hub parts.

7. The driving connection of claim 6, wherein said spring pin sleeve is made of an elastic material, and includes a plurality of longitudinal slots distributed on a circumferential plane.

* * * * *